(12) United States Patent
Olafsrud et al.

(10) Patent No.: US 11,623,769 B2
(45) Date of Patent: Apr. 11, 2023

(54) SELF-HEALING SHIELD CONFIGURED TO PROTECT AN ENVIRONMENT FROM HIGH VELOCITY PARTICLES

(71) Applicants: Andreas Olafsrud, Kailua-Kona, HI (US); Austin Pham, Kailua-Kona, HI (US); Christian Williams, Kailua-Kona, HI (US); Frederick Herrmann, Kailua-Kona, HI (US)

(72) Inventors: Andreas Olafsrud, Kailua-Kona, HI (US); Austin Pham, Kailua-Kona, HI (US); Christian Williams, Kailua-Kona, HI (US); Frederick Herrmann, Kailua-Kona, HI (US)

( * ) Notice: Subject to any disclaimer, the term of this patent is extended or adjusted under 35 U.S.C. 154(b) by 234 days.

(21) Appl. No.: 17/153,815

(22) Filed: Jan. 20, 2021

(65) Prior Publication Data

US 2021/0163156 A1 Jun. 3, 2021

Related U.S. Application Data

(60) Provisional application No. 62/970,718, filed on Feb. 6, 2020.

(51) Int. Cl.
*B64G 1/56* (2006.01)
*B64G 1/60* (2006.01)

(52) U.S. Cl.
CPC .......... *B64G 1/56* (2013.01); *B64G 1/60* (2013.01)

(58) Field of Classification Search
CPC ................. B64G 1/56; F41H 5/007
See application file for complete search history.

(56) References Cited

U.S. PATENT DOCUMENTS

| | | | | |
|---|---|---|---|---|
| 3,291,333 A | * | 12/1966 | House | F16J 15/00 220/900 |
| 3,439,885 A | * | 4/1969 | Sackleh | B64G 1/56 244/135 R |
| 3,649,426 A | * | 3/1972 | Name not available | F41H 5/0428 428/68 |
| 3,666,133 A | * | 5/1972 | Benning | B64G 1/56 525/445 |

(Continued)

FOREIGN PATENT DOCUMENTS

| CN | 206635604 U | * 11/2017 |
|---|---|---|
| WO | 2010/053611 | 5/2010 |

OTHER PUBLICATIONS

Pham, et al., "ASM Corporis", Presented at the National Space Society Space Settlement Contest, Feb. 2019, <https://space.nss.org/settlement/nasa/Contest/Results/2019/ASM-Corporis.pdf> Accessed Jan. 15, 2021.

(Continued)

*Primary Examiner* — Joseph W Sanderson
(74) *Attorney, Agent, or Firm* — Culpepper IP, LLLC; Kerry S. Culpepper

(57) ABSTRACT

A self-healing shield panel for protecting a spacecraft against High Velocity Particles (HVPs). The self-healing shield includes an exterior layer and an interior layer connected to define a cavity which contains a dilatant fluid with a plurality of spheroids. The kinetic energy from HVP impact is dispersed by the plurality of spheroids and absorbed by the dilatant fluid. The plurality of spheroids within the cavity move to block a puncture hole in the shield.

20 Claims, 15 Drawing Sheets

(56) References Cited

U.S. PATENT DOCUMENTS

| | | | | |
|---|---|---|---|---|
| 3,896,758 | A * | 7/1975 | Di Battista | G01W 1/00 73/12.05 |
| 4,923,741 | A | 5/1990 | Kosmo | |
| 5,601,258 | A * | 2/1997 | McClymonds | B64G 1/56 428/36.1 |
| 5,610,363 | A | 3/1997 | Crews | |
| 6,206,328 | B1 * | 3/2001 | Taylor | B64G 1/12 244/159.6 |
| 6,231,010 | B1 | 5/2001 | Schneider | |
| 6,547,189 | B1 | 4/2003 | Raboin | |
| 6,712,318 | B2 * | 3/2004 | Gubert | B64G 1/56 244/121 |
| 8,079,297 | B1 * | 12/2011 | Kocher | F41H 5/007 89/902 |
| 8,272,311 | B2 * | 9/2012 | Cannon | F41H 5/0492 89/36.17 |
| 8,865,798 | B2 | 10/2014 | Merle | |
| 9,327,848 | B2 * | 5/2016 | Bigelow | B64G 1/56 |
| 9,441,918 | B1 * | 9/2016 | Warren | F41H 5/007 |
| 10,837,740 | B2 * | 11/2020 | Cohen | F41H 5/0492 |
| 11,001,684 | B2 * | 5/2021 | Gordon | B29C 73/18 |
| 11,192,667 | B2 * | 12/2021 | Gordon | B32B 27/308 |
| 11,226,178 | B1 * | 1/2022 | Goepfert | F41H 5/007 |
| 2003/0213873 | A1 * | 11/2003 | Gubert | B64G 1/58 244/171.7 |
| 2007/0178374 | A1 * | 8/2007 | Aizenberg | H01M 50/489 429/127 |
| 2008/0296435 | A1 | 12/2008 | Cohen | |
| 2012/0186430 | A1 | 7/2012 | St. Claire | |
| 2012/0186431 | A1 | 7/2012 | St. Claire | |
| 2012/0186437 | A1 * | 7/2012 | Cannon | F41H 5/0492 89/902 |
| 2012/0189808 | A1 * | 7/2012 | Wendell | B32B 9/045 977/762 |
| 2013/0327894 | A1 | 12/2013 | Bigelow | |
| 2014/0150636 | A1 * | 6/2014 | Baron, Sr. | F41H 5/0457 89/36.02 |
| 2016/0152809 | A1 * | 6/2016 | Gordon | C08J 5/18 524/556 |
| 2016/0167811 | A1 * | 6/2016 | Gordon | B32B 27/08 428/521 |
| 2018/0017358 | A1 * | 1/2018 | Cohen | F41H 5/0492 |
| 2021/0140099 | A1 * | 5/2021 | Wagner | D06M 17/00 |
| 2021/0291486 | A1 * | 9/2021 | Wagner | B32B 5/026 |

OTHER PUBLICATIONS

Pham, et al., "ASM Oculus", Presented at the National Space Society Space Settlement Contest, Feb. 2018. Unpublished.

Olafsrud, et al., "Crux", Presented at the National Space Society Space Settlement Contest, Feb. 2020 Unpublished.

* cited by examiner

1102

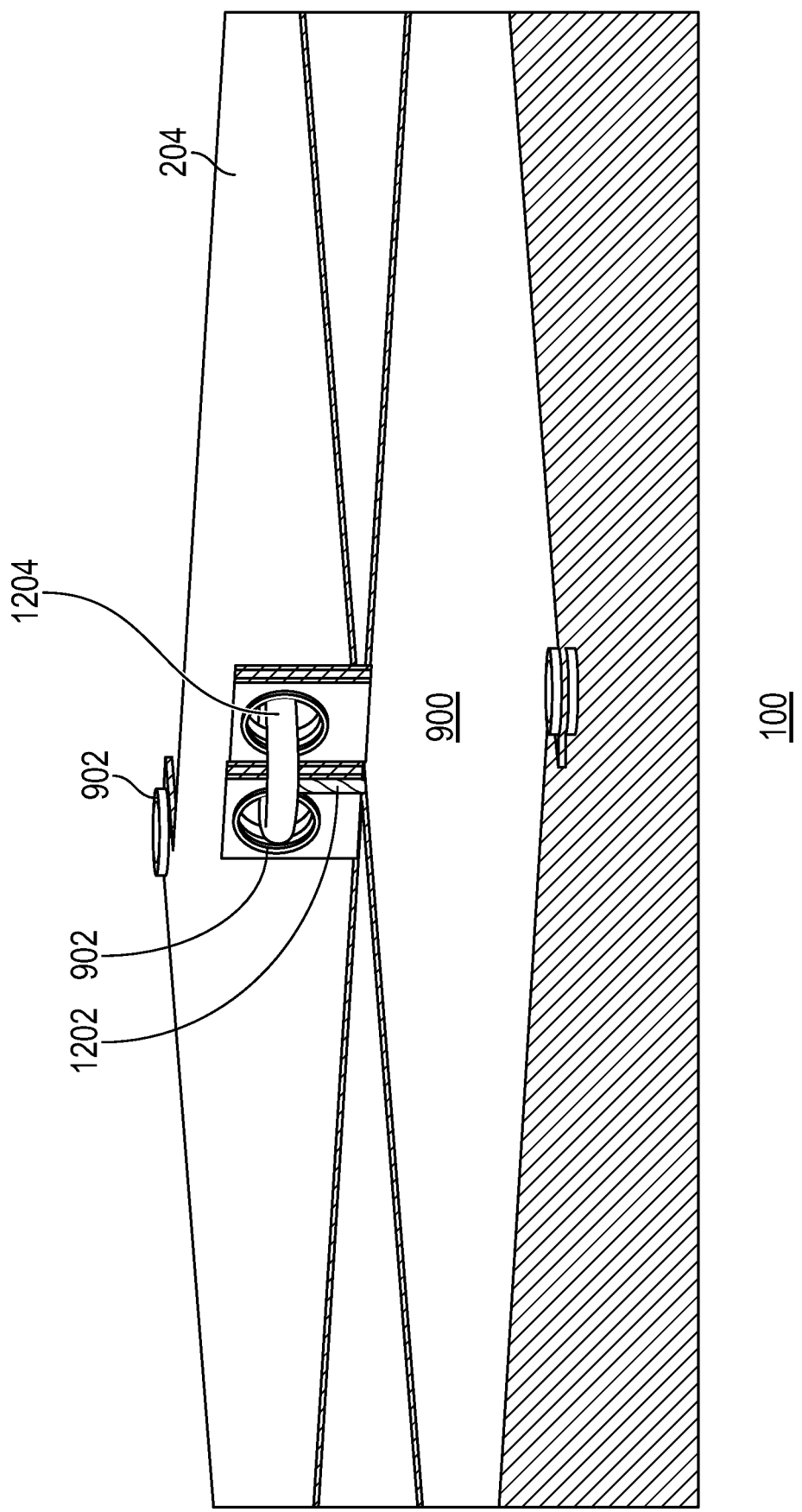

SELF-HEALING SHIELD CONFIGURED TO PROTECT AN ENVIRONMENT FROM HIGH VELOCITY PARTICLES

CROSS-REFERENCE TO RELATED APPLICATION

The present application claims the benefit of U.S. Provisional Patent Application No. 62/970,718 filed on Feb. 6, 2020, the contents of which are incorporated herein by reference.

TECHNICAL FIELD

The technical field relates to a shield and, more particularly, to a shield adapted to protect a fragile environment from high velocity particles.

BACKGROUND

As space exploration becomes increasingly common, there is a serious need for protection of sensitive environments such as spacecrafts inhabited by humans from the dangers of outer space, including radiation, extreme temperatures, and variable pressures. One particularly prominent risk for a spacecraft is high velocity particles ("HVPs") from micrometeroids and other space debris which can cause significant damage by penetrating the spacecraft and impairing essential functions. The NASA Orbital Debris Program Office estimates a population in the 10s of millions of particulates smaller than 1 cm with populations of given diameters increasing exponentially as mass decreases. Any particle traveling over roughly 2-3 km/s is categorized as an HVP, though a 20 km/s speed is considered typical. Space debris from human pollution have an estimated average speed of 9.5 km/s. According to Newtonian physics, the high velocities result in enormous kinetic energy as given by $K=(0.5)(mv^2)$. The range of damage caused by the impact of HVPs on a spacecraft is considerable.

SUMMARY

Penetration of a spacecraft by an HVP can lead to inner subsystem failure, degradation of sensors, depressurization of vessels, depressurization of crew quarters, and short circuits, any of which may lead to mission failure or loss of life. Thus, effective shielding must be able to protect the sensitive environment of a spacecraft from HVPs.

While previous shield structures have been introduced, the challenges of spaceflight render these shields ineffective in significant manners. For example, there remains a need for a shielding that provides protection from HVPs, can self-heal after HVP impact, can be replaceable, and is light enough to launch into outer space.

In view of the above problems, an exemplary embodiment includes a panel for a self-healing shield which includes an exterior layer connected to an interior layer to define a cavity containing a dilatant fluid and a plurality of spheroids. According to another embodiment, the cavity contains a mesh member which retains the plurality of spheroids within a first layer of the cavity, closest to an interior of the exterior layer.

Generally, the plurality of spheroids guarantees radial and lateral distributions of kinetic energy while the motions of the spheroids are dampened by the shear thickening of the dilatant fluid. If an HVP creates an impact strong enough to puncture the exterior layer of the shield and create a puncture hole, the cavity is exposed to an external environment, causing the dilatant fluid and plurality of spheroids within the cavity to move towards the punctured hole. The plurality of spheroids is able to close or "plug" the puncture hole such that the shield "self-heals" when punctured by HVP impact.

According to various embodiments, the self-healing shield panel includes an exterior shield layer exposed to an exterior environment on a first surface of the exterior shield layer and an interior shield layer exposed to an interior environment on a first surface of the interior shield layer. The interior shield layer is connected to the exterior shield layer to define a cavity between the exterior shield layer and the interior shield layer. Within the cavity is a plurality of spheroids arranged in a dilatant fluid to absorb kinetic energy from an HVP. Multiple shield panels can be connected together to completely enclose the interior environment. The interior environment may be or include, for example, a spacecraft. According to various embodiments, the multiple shield panels may enclose every surface of the entire spacecraft, or only the outermost surfaces which may carry higher risk for HVP impacts or may require higher protection for inhabitants, instruments, or other important cargo. According to various embodiments, the shield panel may have dimensions of 55 cm×55 cm×6.5 cm.

The exterior shield layer and the interior shield layer can be made with a synthetic fiber, such as an ultra-high-molecular-weight polyethylene. The dilatant fluid can be polyethylene glycol or polypropylene glycol. In one aspect, the dilatant fluid may include a high-viscosity, non-Newtonian fluid including a plurality of suspended fumed silica nanoparticles and rods.

The plurality of spheroids can be composed of polymer, metallic materials such as steel, aluminum, or varying alloy combinations, or a high strength plastic material, such as polyetherimide, and range in diameters from 0.17 mm to 1.26 cm. In one embodiment, 67% of the plurality of spheroids have a diameter of 0.17 mm, 22% have a diameter of 0.7 mm, 7.6% have a diameter of 3 mm, and 3.4% have a diameter of 1.26 cm.

According to an aspect, the shield panel is operating in a state of artificial gravity. The cavity includes a first cavity layer on the exterior shield layer and a second cavity layer on the interior shield layer. Both the first cavity layer and the second cavity layer include the dilatant fluid. The plurality of spheroids are arranged only in the first cavity layer during a rest state where substantially zero kinetic energy exists in the cavity. Upon impact from a HVP, the plurality of spheroids are arranged to move into the second cavity layer and thereby absorb the kinetic energy. If the HVP creates a puncture hole in the exterior shield layer, the plurality of spheroids is arranged to move towards and fill the puncture hole and thereby prevent leakage of the dilatant fluid.

According to an aspect, the shield panel is operating in a state of zero gravity and the cavity includes a first cavity layer on the exterior shield layer and a second cavity layer on the interior shield layer. Both the first and second cavity layers include the dilatant fluid. However, a mesh member retains the plurality of spheroids only in the first cavity layer during a rest state where substantially zero of the kinetic energy exists. Upon impact from an HVP, the mesh member is configured to temporarily expand to accommodate motion of the plurality of spheroids into the second cavity layer and thereby absorb the kinetic energy. The mesh member can be made with a viscoelastic polymer. Alternatively, the mesh member can be made from a tear resistant material, including an ultra-high-molecular-weight polyethylene.

In one embodiment, a plurality of shield panels can cover a spacecraft, which may include a central hub, a plurality of spokes connected to the central hub, and an outer rim connected to the plurality of spokes. In another embodiment, a plurality of shield panels may only cover the outer rim of the spacecraft.

In various embodiments, the plurality of shield panels may be connected to each other by threading a synthetic fiber through grommets inlaid within a piece of synthetic fiber connected to the corners of an exterior shield layer of a shield panel. The synthetic fiber threading may be connected to an exterior of a spacecraft such that the plurality of shield panels can be connected to the spacecraft by the synthetic fiber thread. In other embodiments, a ring may connect a plurality of shield panels, which can be connected to the spacecraft by the synthetic fiber thread connecting the ring to the spacecraft.

In alternative embodiments, the plurality of shield panels may be connected both to each other and to a spacecraft by interlocking flush mounts attached to the sides of the shield panel.

BRIEF DESCRIPTION OF THE DRAWINGS

FIG. 12B depicts a perspective view of four shield panels connected to each other and the spacecraft.

DETAILED DESCRIPTION OF EMBODIMENTS

Figure 1:
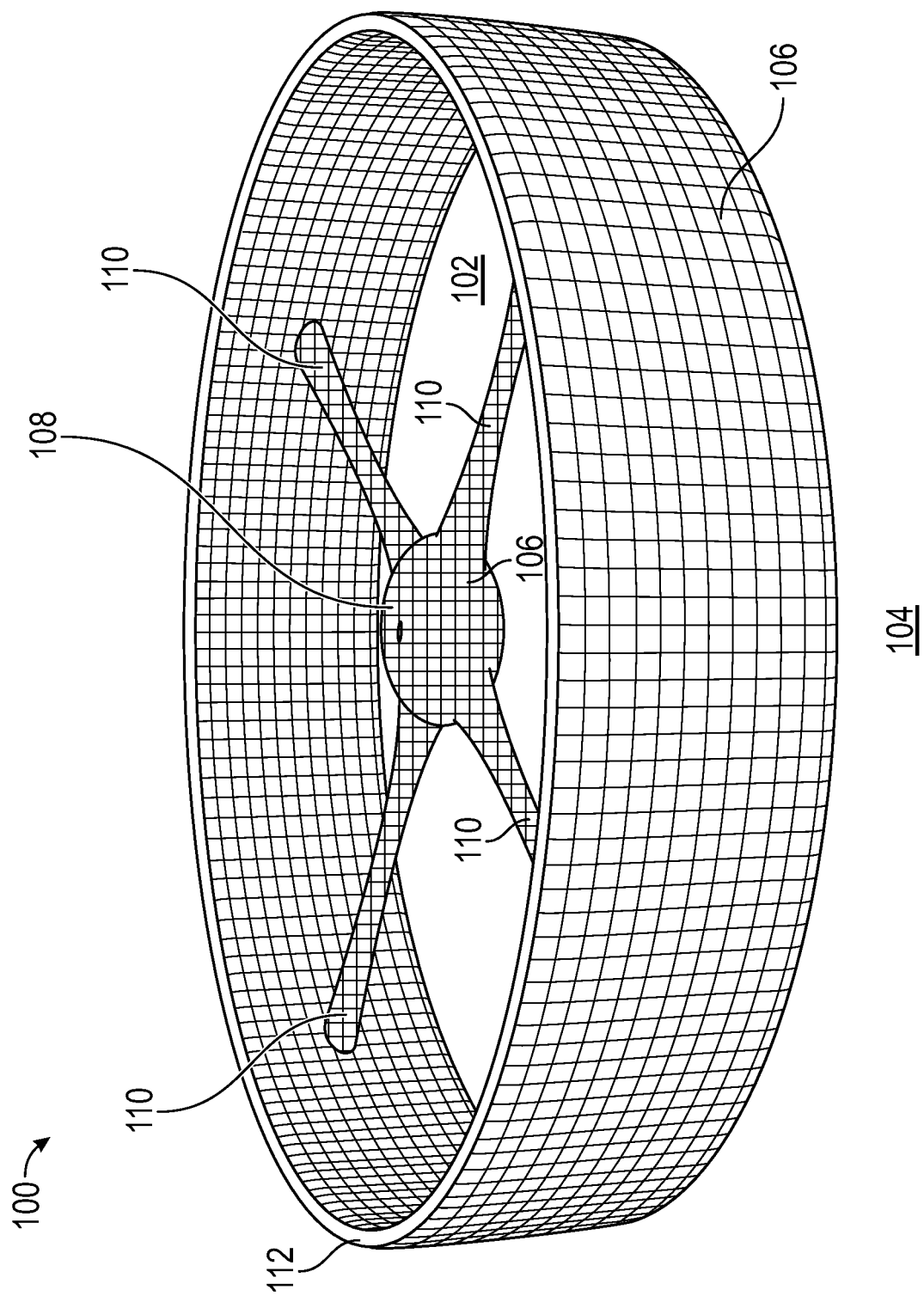
FIG. 1 depicts a spacecraft with a plurality of shield panels on all surfaces according to an exemplary embodiment.

The accompanying figures, in which like reference numerals refer to identical or functionally similar elements, together with the detailed description below are incorporated in and form part of the specification and serve to further illustrate various exemplary embodiments and explain various principles and advantages in accordance with the present invention.

Hereinafter, referring to the drawings as needed, exemplary embodiments will be described in detail. However, more detailed description than necessary may be omitted. For example, detailed description of well-known items or overlapping description of substantially the same configurations may be omitted. This is to avoid unnecessary redundancy in the following description, and facilitate understanding of those in the art. The accompanying drawings and the following description are provided for those in the art to sufficiently understand the present disclosure and are not intended to limit the subject described in the claims.

The instant disclosure is provided to further explain in an enabling fashion the best modes of performing one or more embodiments of the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions.

Reference will now be made in detail to the accompanying drawings. Wherever possible, the same reference numbers will be used throughout the drawings to refer to the same or like parts.

Referring to FIG. 1, an exemplary implementation of a shield according to various embodiments will be discussed. An exemplary spacecraft 100 may include a central hub 108 with a plurality of spokes 110 extending therefrom. The spacecraft 100 may operate in a state of zero gravity in outer space. Rotation of the central hub 108 can create a state of artificial gravity within the spacecraft 100 via rotation of the spacecraft 100 using, for example, rocket boosters, thrusters, or other methods known in the art. As described more fully below, the shield includes a plurality of shield panels 106 to protect an environment. In the figures, the plurality of shields 106 references any, number of shield panels connected together to form a part of or the whole shield. In this exemplary embodiment, the protected environment includes the central hub 108, the plurality of spokes 110, and an outer rim 112.

Figure 13:
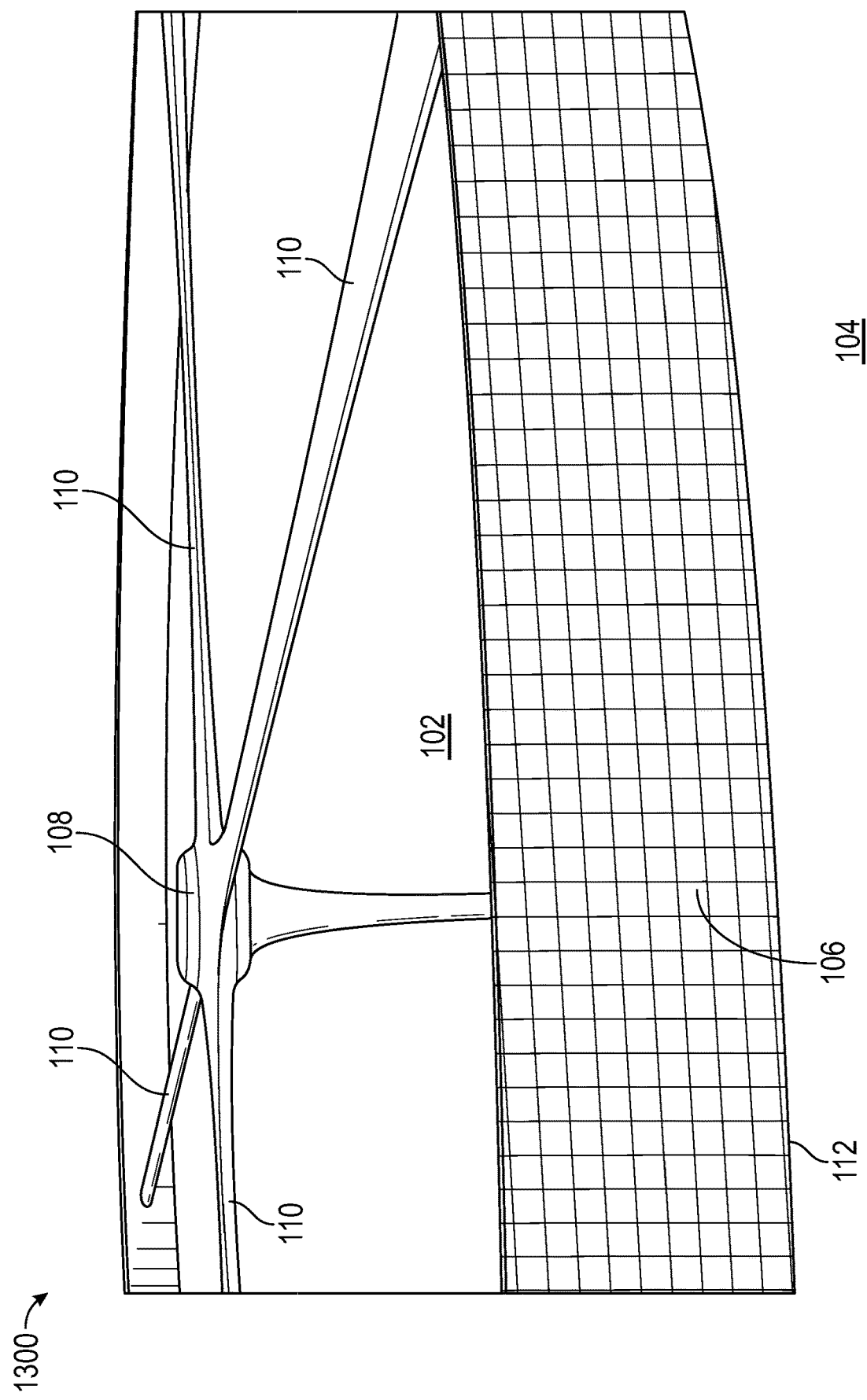
FIG. 13 depicts a spacecraft with a plurality of shield panels on an outer rim according to an exemplary embodiment in which the spacecraft includes a plurality of spokes connected to a top and bottom of a central hub.

Referring to FIG. 13, another exemplary shielding for a spacecraft 1300 may include a plurality of shield panels 106 protecting an outer rim 112. The outer rim 112 may inhabit people. The spacecraft 1300 may include a central hub 108 with a plurality of spokes 110 extending from a top and bottom of the central hub 108 (although only the top spokes are shown). This exemplary spacecraft 1300 may operate in a state of zero gravity, or a state of artificial gravity created through rotation of the central hub 108.

Figure 14:
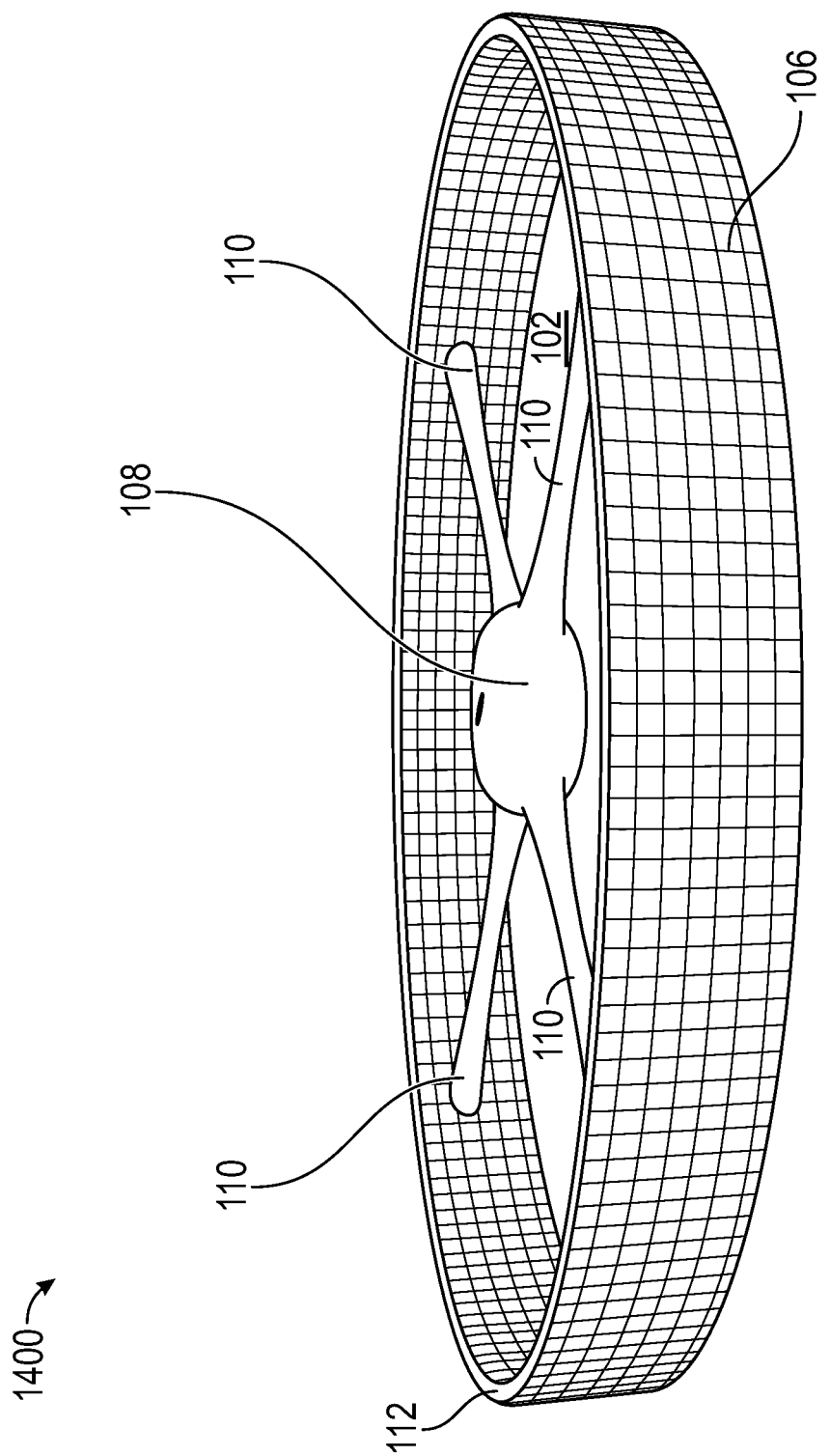
FIG. 14 depicts a spacecraft with a plurality of shield panels on an outer rim according to an exemplary embodiment.

Referring to FIG. 14, another exemplary implementation of a shield for a spacecraft 1400 includes a plurality of shield panels 106 to protect an environment, which may include an outer rim 112. The spacecraft 1400 may require shielding on the outer rim 112 for lower launch weight, protection of inhabitants residing in the outer rim 112, monetary considerations, or other issues known the those of ordinary skill in the art. Similarly, this exemplary spacecraft 1400 may operate in a state of zero gravity, or a state of artificial gravity created through rotation of a central hub 108.

Of course, numerous embodiments of the shielding can be implemented and is not limited to the above embodiments.

First Exemplary Embodiment

Referring to FIGS. 2-6, a first exemplary embodiment of the shield will be discussed with respect to a case in which it operates in a state of artificial gravity.

Figure 2:
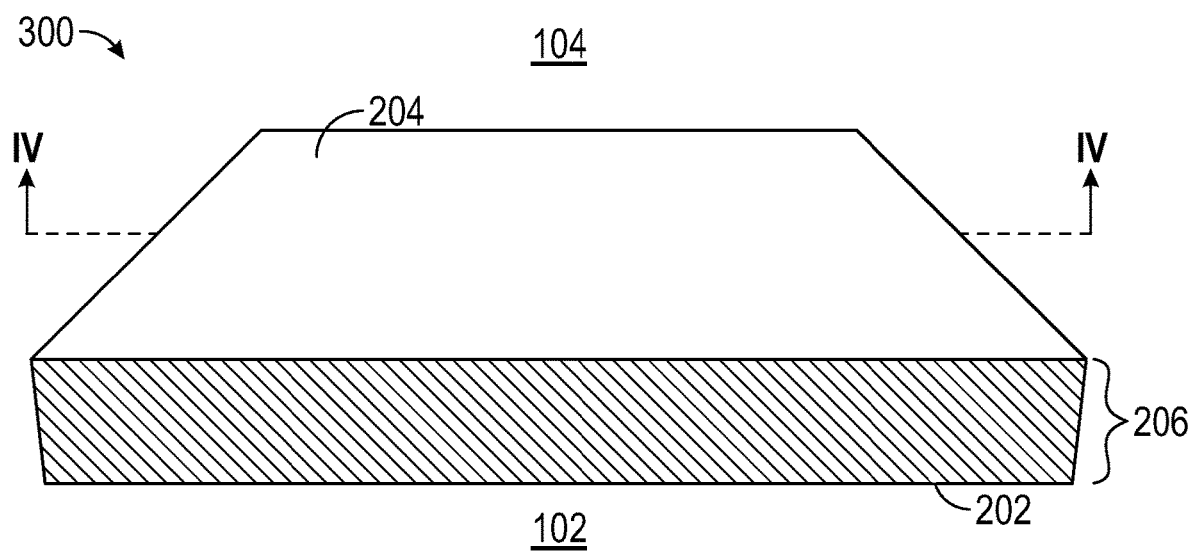
FIG. 2 is a perspective view of a shield panel according to an exemplary embodiment.
Figure 3:
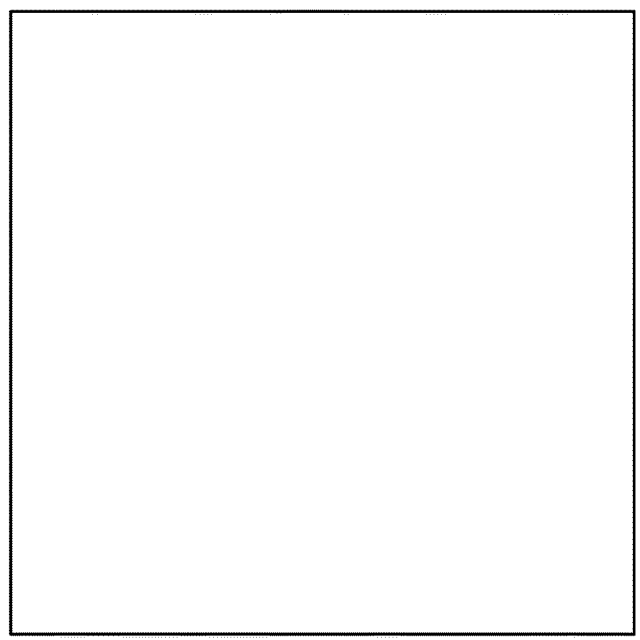
FIG. 3 is a top-side view of the shield panel.
Figure 4A:
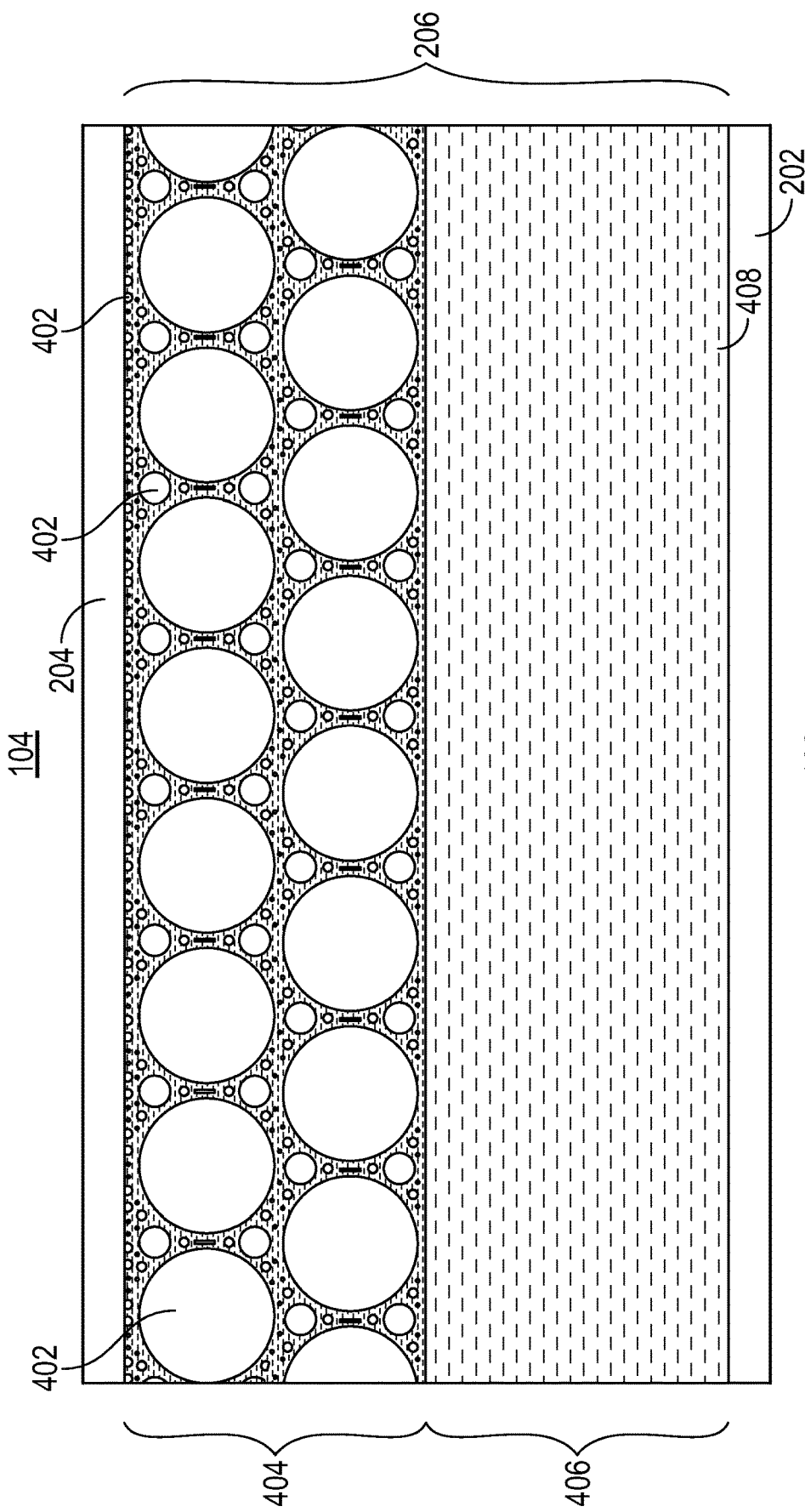
FIG. 4A is a view of a portion of the shield panel along lines IV-IV of FIG. 2.
Figure 4B:
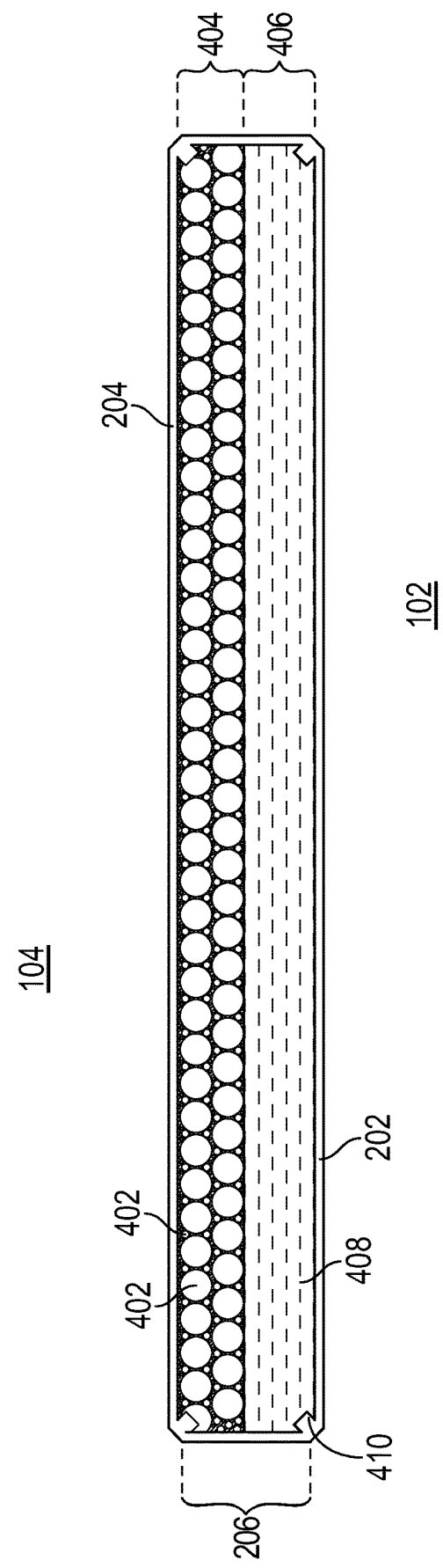
FIG. 4B is a view of the entire shield panel along lines IV-IV of FIG. 2.

Referring first to FIG. 3, a shield panel 300 is discussed. Referring to FIG. 2, the shield panel 300 includes an exterior shield layer 204 exposed to an external environment 104 and an interior shield layer 202 exposed to an interior environment 102. Returning to FIG. 1, the interior environment 102 refers to an area confined by the shield such as the interior of the spacecraft 100, which can include the central hub 108, the plurality of spokes 110, and the outer rim 112. The external environment 104 refers to an area outside of the shield, such as outer space. For a case as shown in FIGS. 13-14 in which the shield is shaped like a circle, the interior environment 102 would refer to the area of the circle while the external environment 104 would refer to the area outside the circle.

Returning to FIG. 4A-B, the exterior shield layer 204 and the interior shield layer 202 are connected to define a cavity 206. The cavity 206 includes a plurality of spheroids 402 and a dilatant fluid 408. The plurality of spheroids 402 can fill 50 percent of the volume of the cavity 206 and the remaining volume of the cavity 206 can be filled with the dilatant fluid 408.

The diameter of the plurality of spheroids 402 ranges from 0.17 mm to 1.26 cm. The preferred ratio of the plurality of spheroids 402 is 67% having a diameter of 0.17 mm, 22% having a diameter of 0.7 mm, 7.6% having a diameter of 3 mm, and 3.4% having a diameter of 1.26 cm. Since the vast majority of HVPs are less than 1 cm in diameter, this range of spheroid diameters is predicted to heal (FIG. 6) any puncture holes created from an HVP impact.

The cavity 206 includes a first cavity layer 404 and a second cavity layer 406. The first cavity layer 404 refers to an area within the cavity 206 closest to the exterior shield layer 204, whereas the second cavity layer 406 refers to an area within the cavity 206 closest to the interior shield layer 202. Because of artificial gravity and granular segregation (the so-called "Brazil nut effect"), the smaller-diameter spheroids will be lined against the interior of the exterior shield layer 204 in the first cavity layer 404. Thus, the plurality of spheroids 402 is retained in the first cavity layer 404, with larger spheroids stacking below the smaller spheroids closer to the second cavity layer 406.

In the preferred embodiment, the exterior shield layer 204 can be composed of a synthetic fiber expandable and pliable for shielding against HVP impacts. The appropriate type of synthetic fiber varies on the temperature differential in orbit and the rate at which the spacecraft generates and radiates heat. Where temperatures are within a range of tolerance (−150° C. to 140° C.), Dyneema® is the preferred synthetic fiber as it is 15 times stronger than steel and more resistant to Ultraviolet rays than Kevlar®. Where temperature range is a significant concern (−196° C. to 450° C.), Kevlar® is a more reasonable option. Kevlar® is 7 times stronger than steel and may be enhanced with shear thickening fluid for additional strength. Individual sheets of synthetic fibers are woven together such that they are 4 mm thick.

The plurality of spheroids 402 can be made from an aero-space grade polymer such as an ultra-high-molecular-weight polyethylene. In one exemplary embodiment, a hardened plastic polyetherimide such as Ultem® is used. Ultem® is lighter than most metals but strong enough to replace metals in aerospace applications. Ultem® has high heat resistance, high chemical resistance, and high water resistance. In another embodiment, the plurality of spheroids 402 can be made of metal in differing alloy combinations depending on the needs of the conditions of the external environment 104.

The dilatant fluid 408 is a non-Newtonian fluid which increases in viscosity with increased stress. In one embodiment, the dilatant fluid 408 is polyethylene glycol. In another embodiment, the dilatant fluid 408 is polypropylene glycol. In yet another embodiment, the dilatant fluid 408 contains suspended fumed silica particles and rods. The dilatant fluid 408 is in the cavity 206, in both the first cavity layer 404 and the second cavity layer 406.

As discussed more fully below, a plurality of shield panels 106 can be joined together by a synthetic fiber thread 1202 connected to a spacecraft 100. To that end, referring to FIGS. 9-10, a shield panel 900 may have a grommet 902 on a corner of the exterior shield layer 204. The grommet 902 can be made of metal, hardened plastic, synthetic fiber, or other high-tensile strength material known in the art.

Figure 12A:
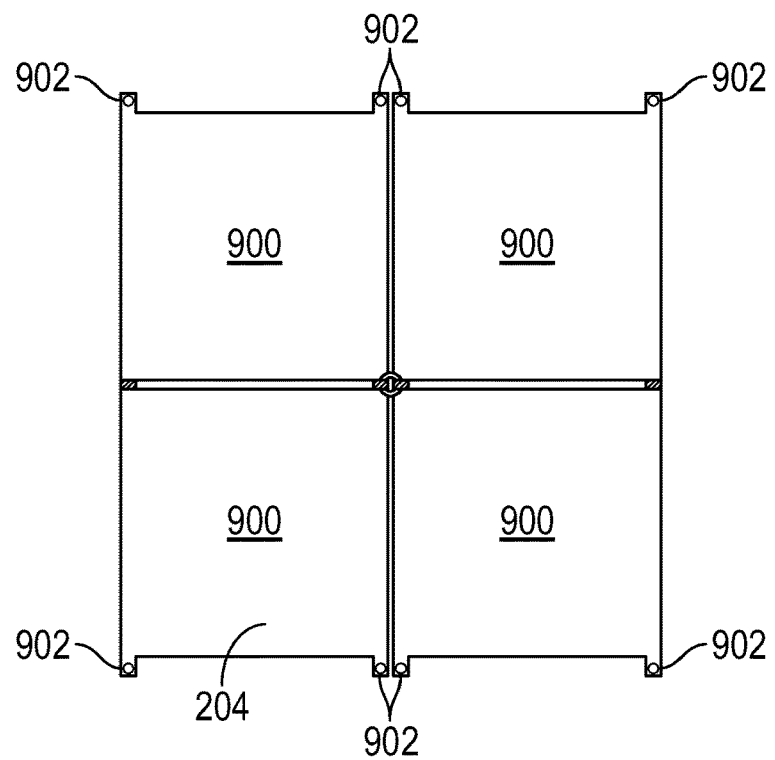
FIG. 12A depicts a top-side view of four shield panels connected to each other and the spacecraft.

Referring to FIG. 12A, a shield panel 900 connected to three other shield panels 900 is shown, all of which are connected to the spacecraft 100 by the synthetic fiber threading 1202. The synthetic fiber threading 1202 may be the same synthetic fiber used in the construction of the shield panel 900, or other high-tensile strength material known in the art.

Figure 12C:
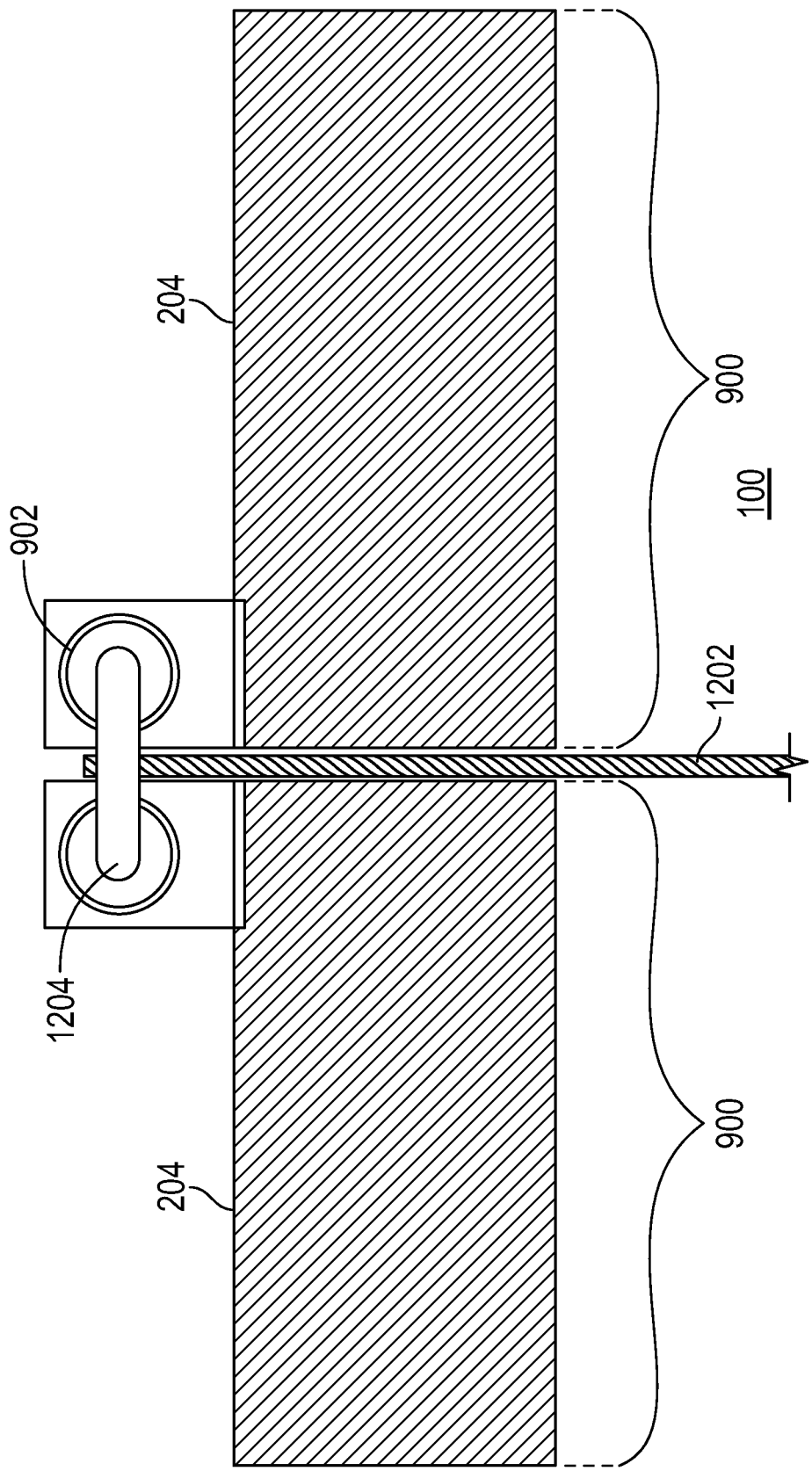
FIG. 12C depicts a horizontal plane view of two shield panels connected to each other and the spacecraft.

Referring to FIGS. 12B-C, a shield panel 900 connected to other shield panels is shown, wherein a ring 1204 connects through a grommet 902 connected to each shield panel 900. The ring 1204 may be made from hardened plastic, metal, synthetic fiber, or other materials of high-tensile strength commonly known in the art.

Figure 11A:
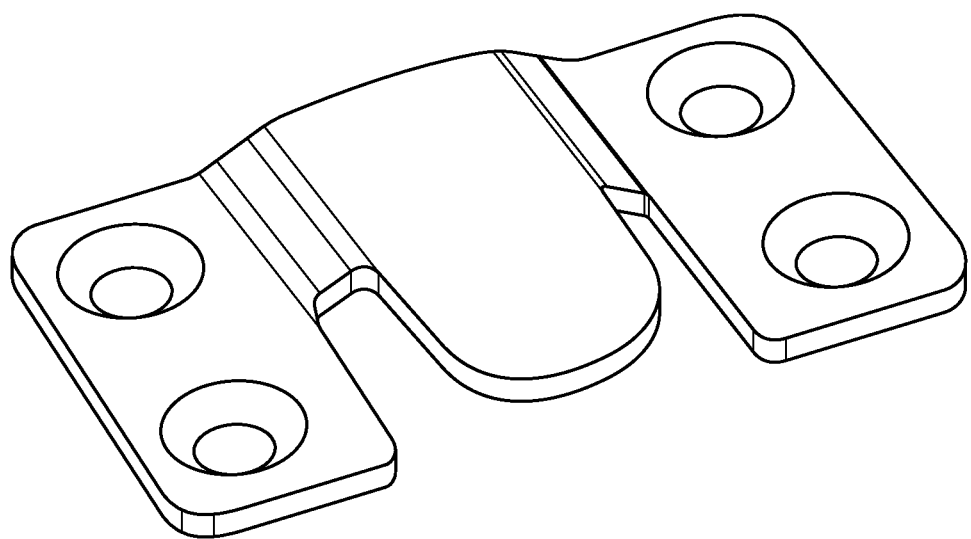
FIG. 11A is a perspective view of an exemplary interlocking flush mount.
Figure 11B:
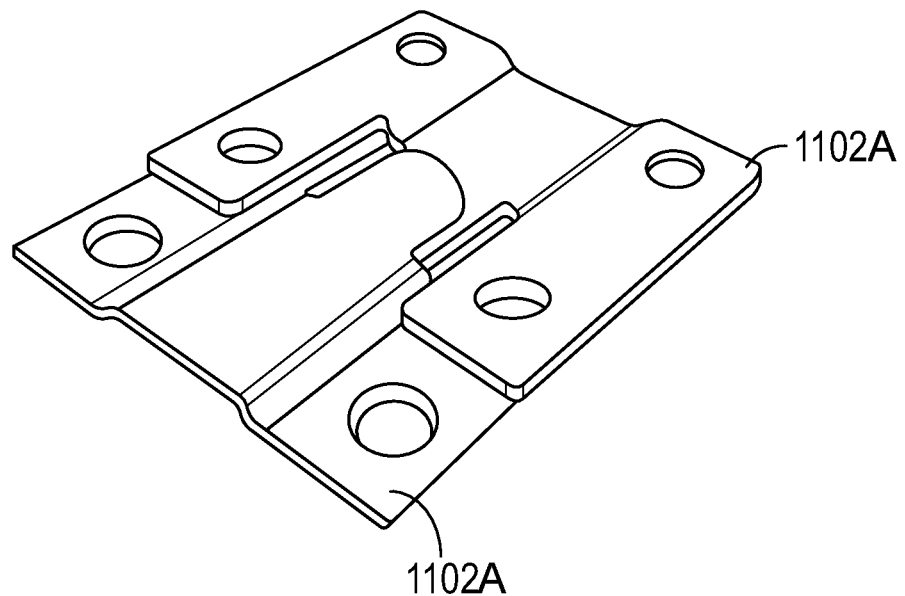
FIG. 11B is a perspective view of two exemplary interlocking mounts connected to each other.
Figure 11C:
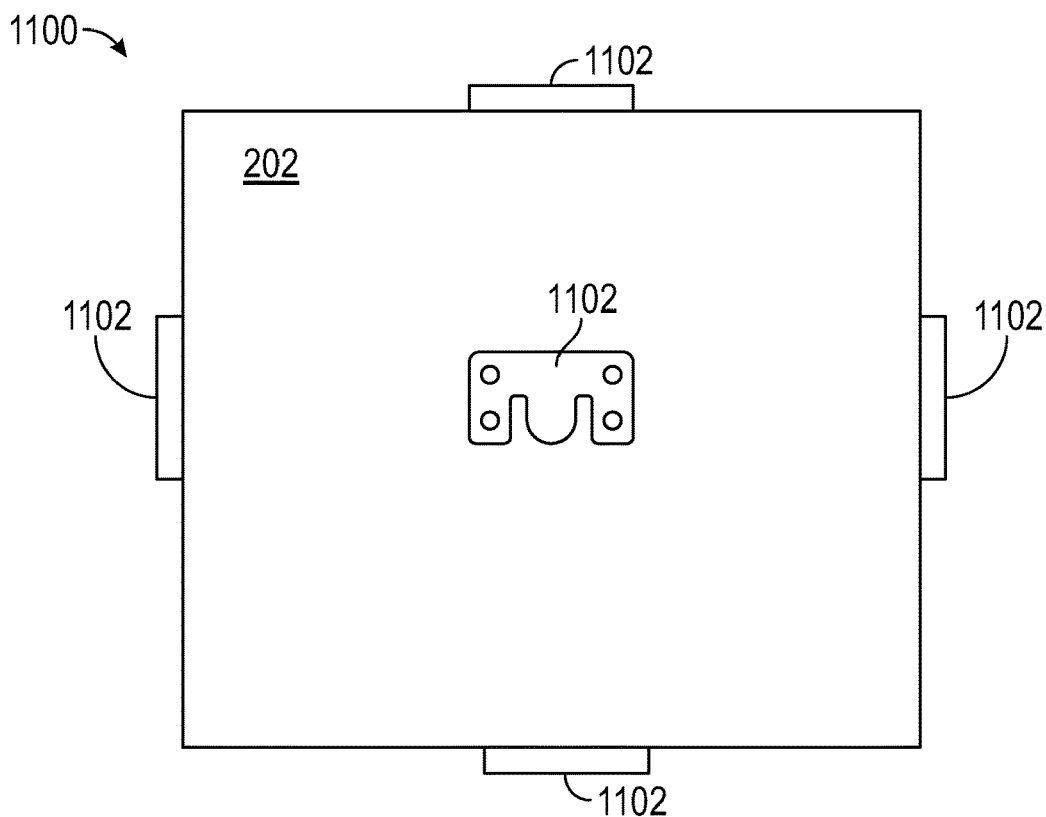
FIG. 11C is a top-side view of a shield panel with five interlocking mounts connected to sides of the shield panel.

Alternatively, referring to FIG. 11A-C, a plurality of shield panels 106 can be joined together through an interlocking flush mount 1102 connected to a side of a shield panel 1100 such that the shield panel 1100 may be connected to another shield panel 1100 on each side, in varying combinations. The interlocking flush mount 1102 may be made from hardened plastic, metal, synthetic fiber, or other materials of high-tensile strength commonly known in the art. Two interlocking flush mounts 1102A may be connected together.

Referring back to FIG. 1, the plurality of shield panels 106 can be joined together to form a shield that covers an entire spacecraft 100 to provide protection from the external environment 104 in one exemplary embodiment.

Referring to FIGS. 13-14, the plurality of shield panels 106 can be joined together to form a shield that covers the outer rim 112 of a spacecraft 1300 in varying exemplary embodiments.

Operation

Figure 5:
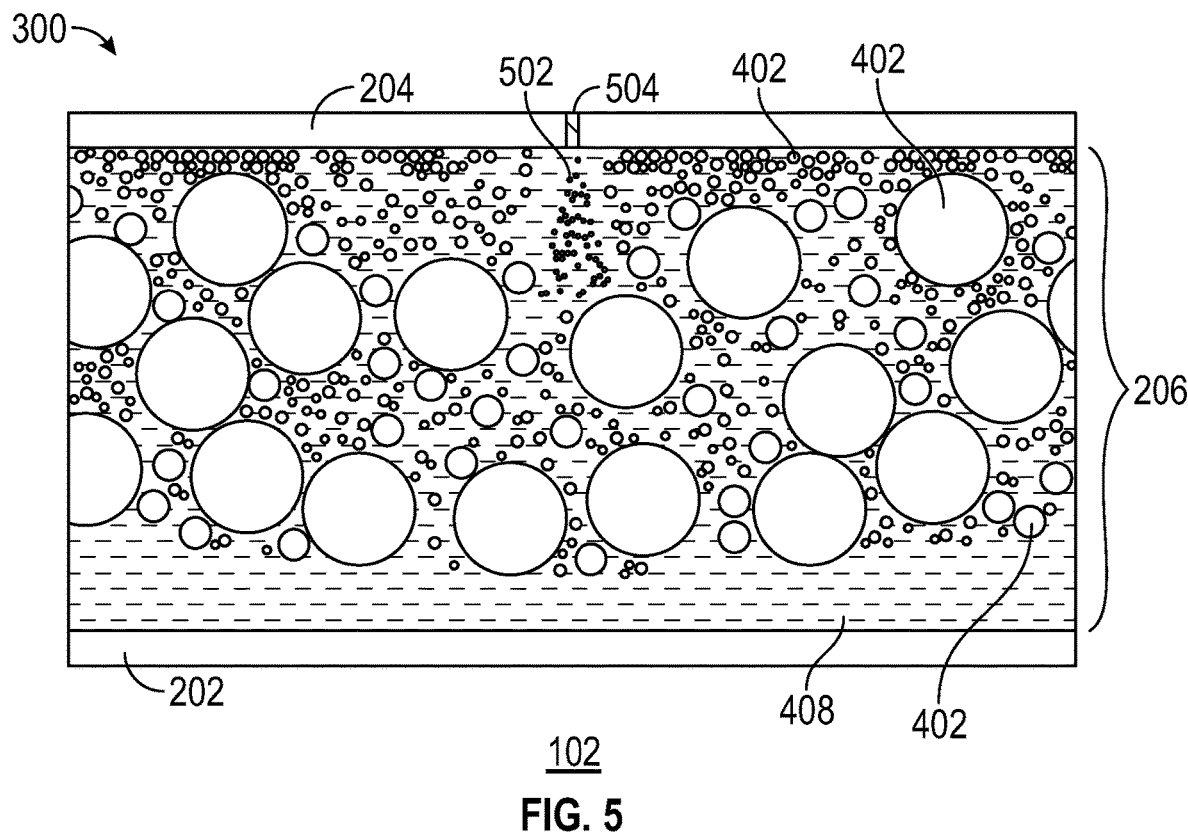
FIG. 5 is an exemplary view of the shield panel at the moment of impact from a high velocity particle.

Referring to FIG. 5, a shield panel 300 at the moment of impact from an HVP 502 is shown. Impact from the HVP 502 may form a puncture hole 504 in the external shield layer 204, resulting in the HVP 502 entering the cavity 206. The HVP 502 may disintegrate upon impact. As the HVP 502 enters the cavity 206, the kinetic energy from the HVP 502 is dispersed laterally and radially from a plurality of spheroids 402. The curved surface of a spheroid ensures the HVP 502 will have an angle of deflection upon initial contact with the spheroid. As the HVP 502 makes contact with the spheroid, the kinetic energy is laterally and radially dispersed to other spheroids. Those secondary spheroids then disperse the kinetic energy further to other spheroids, and so on and so forth, ultimately dispersing a single point of large kinetic energy into many separate vectors amongst the plurality of spheroids 402.

Concurrently, the kinetic energy dispersed from the HVP 502 impact further reacts with a surrounding dilatant fluid 408 such that the force of kinetic energy from the HVP 502 impact and the kinetic energy transferred to the plurality of spheroids 402 increases the viscosity of the dilatant fluid 408, absorbing kinetic energy from the HVP 502 impact and dispersions thereof. Thus, the HVP 502 impact is simultaneously dispersed amongst the plurality of spheroids 402 and absorbed by the dilatant fluid 408, shielding the interior environment 102 from harm.

Figure 6:
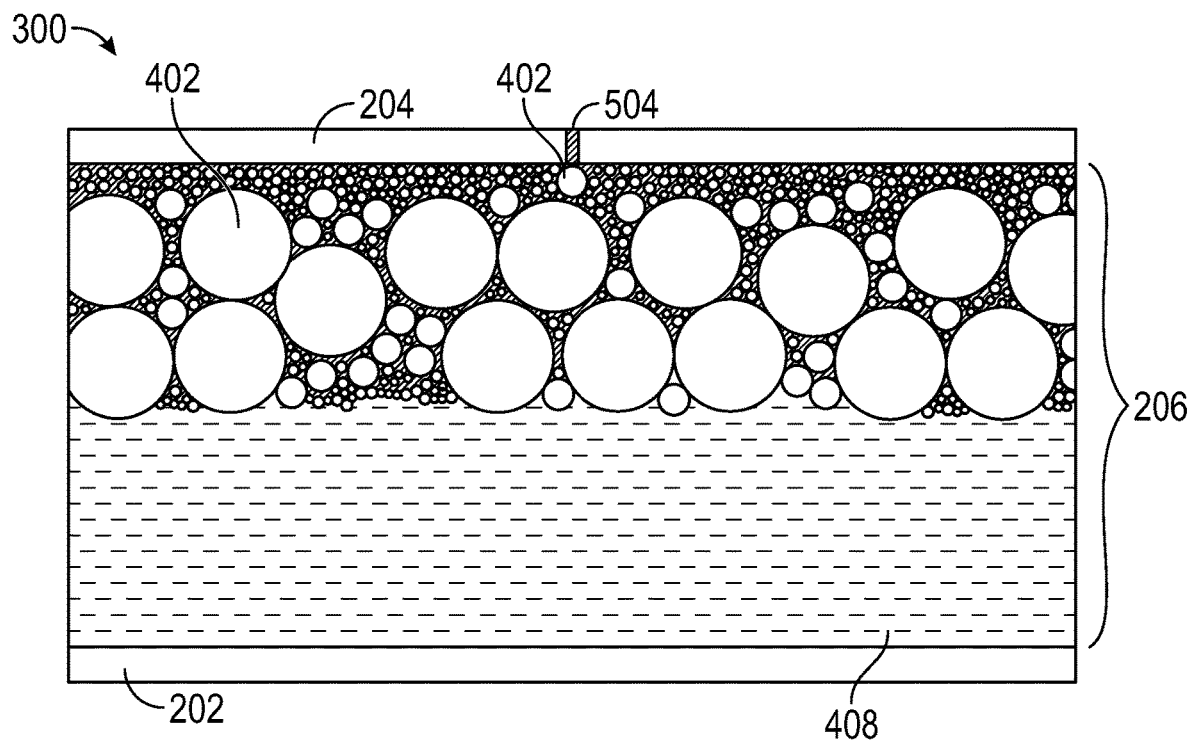
FIG. 6 is a view of the shield panel self-healing after penetration from a high velocity particle.

Referring to FIG. 6, a shield panel 300 self-healing is shown. After impact from an HVP 502 that forms a puncture hole 504 in the external shield layer 204, the pliable nature of the external shield layer 204 vents a dilatant fluid 408 outwards, thus bending the puncture hole 504 toward the external environment 104. The vacuum of space, force of artificial gravity, and the flow of the dilatant fluid 408 expels the contents of the cavity 206 towards the puncture hole 504. However, a plurality of spheroids 402 moves to fill in the puncture hole 504, effectively blocking or "plugging" the puncture hole 504 from expelling any additional dilatant fluid 408. Here, the range of spheroid diameters and the ratio of spheroids ensure that different sized puncture holes can be successfully blocked or plugged from further expulsion of contents from the cavity 206. Furthermore, a single shield panel 300 can withstand multiple HVP 502 impacts with the plurality of spheroids 402.

If the shield panel 300 undergoes multiple HVP 502 impacts such that it is no longer able to self-heal, only the dilatant fluid 408 in the shield panel 300 will drain, allowing replacement of the shield panel 300, as well as the retainment of the plurality of spheroids 402.

Construction

An exemplary method of making the shield will be discussed with respect to an exemplary embodiment in which each spacecraft shield panel 300 has dimensions of 55 cm×55 cm×6.5 cm.

The interior shield layer 202 can be formed concurrently with the exterior shield layer 204. Woven synthetic fiber sheets are cut to the dimensions 17 cm×132 cm. At 6.5 cm of length, the synthetic fiber sheet is creased. At 7.5 cm, the synthetic fiber sheet creased. At 8.5 cm, it is creased once more. This creates two lengths of 1 cm between the creases. These 1 cm lengths are overlapped and heat-welded at no more than 135° C. to heat weld the seam. The welded 1 cm length will be on the inside of the shield panel. The above process is repeated at 6.5 cm from the first crease to form a second crease. The process is repeated to form a third crease 55 cm from the length of the second crease. A fourth crease is formed 6.5 cm from the third crease using the same process. This forms an open-ended cuboid on two sides with overlapping edges. Finally, the overlapping edges are heat-welded to form an enclosed cuboid.

A sheet of woven synthetic fiber measuring 8.5 cm×57 cm is creased 1 cm from each edge along the length and height of the sheet. The creases 410 are inlaid within one open end of the cuboid and heat-welded on all four edges where the creases 410 line the open end of the cuboid. This forms a cuboid with only one open end and fully enclosed on all other sides, defining a cavity 206. After the cavity 206 has been filled (FIGS. 4A-B), a final sheet of woven synthetic fiber measuring 8.5 cm×57 cm is creased as above, and heat-welded to the top of the open-ended cuboid to fully enclose the cuboid, forming a wholly enclosed shield panel 300.

Alternatively, instead of one 17 cm×132 cm sheet of woven synthetic fiber, two 8.5 cm×66 cm sheets of woven synthetic fiber may be used such that the overlapping creases of each sheet are heat-welded together 1.5 instead of heat-welded from one sheet of woven synthetic fiber.

Figures 9, 10:
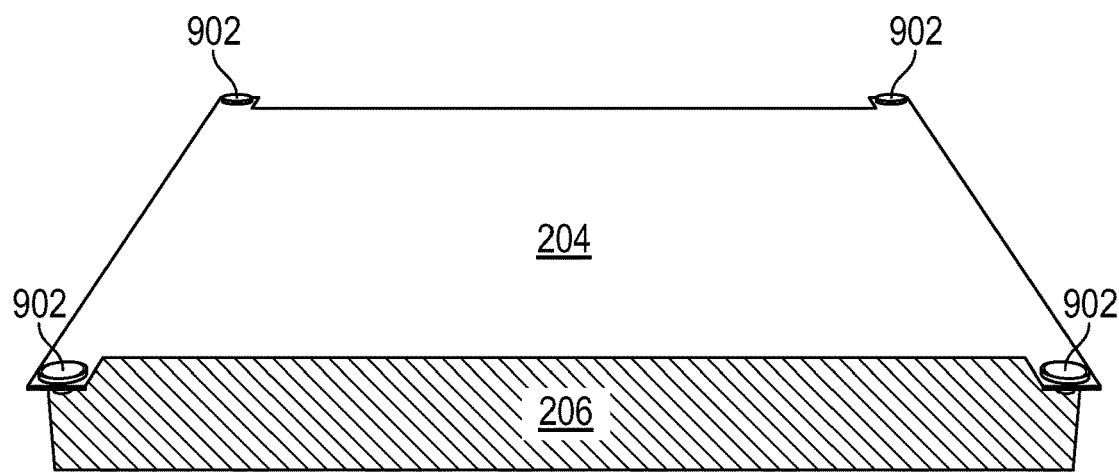
FIG. 9 depicts a perspective view of the shield panel according to an exemplary embodiment in which the shield panel includes a grommet on each corner of the shield panel.
FIG. 10 depicts a top-side view of the shield panel according to an exemplary embodiment in which the shield panel includes the grommet on each corner of the shield panel.

Referring now to FIG. 9, a shield panel 900 may be connected to a plurality of other shield panels 900 through a grommet 902 inlaid into a corner of the shield panel 900. In one embodiment, a sheet of woven synthetic fiber with the inlaid grommet 902 is heat-welded to one or more corners of a shield panel 900 such that a synthetic fiber thread 1202 connected to a spacecraft 100 can be threaded through the grommet 902. AH four corners of the shield panel 900 may have the grommet 902 inlaid, such that the plurality of shield panels 106 can be connected by the synthetic fiber threading 1202. Thus, each synthetic fiber thread 1202 may connect up to four shield panels 900 to the spacecraft 100 to form a shield of the plurality of shield panels 106.

Referring to FIG. 12A, a shield panel 900 connected to three other shield panels 900 is shown, all of which are connected to a spacecraft 100 by a synthetic fiber threading 1202.

Referring to FIGS. 12B-C, a shield panel 900 connected to other shield panels 900 is shown, wherein a ring 1204 connects through a grommet 902 connected to each shield panel 900. A synthetic fiber thread 1202 connected to a spacecraft 100 may connect to the ring 1204, connecting a plurality of shield panels 106 to the spacecraft 100.

In a case where the spacecraft 100 has a metallic hull, the synthetic fiber thread 1202 may be woven into the spacecraft 100 itself to connect the plurality of shield panels 106. In a case where the spacecraft 100 has a synthetic fiber hull, the synthetic fiber thread 1202 can be woven or heat-welded into the surface of the spacecraft 100. The ring 1204 may be made from hardened plastic, metal, synthetic fiber, or other materials of high tensile strength commonly known in the art.

Alternatively, referring to FIG. 11A-C, a plurality of shield panels 106 can be joined together through an interlocking flush mount 1102 connected to a side of a shield panel 1100 such that the shield panel 1100 may be connected to another shield panel 110 on each side, in varying combinations. The shield panel 1100 may be connected to the spacecraft 100 itself through the interlocking flush mount 1102A which is connected to the spacecraft 100 and a side of the shield panel 1100. This would allow individual shield panels 1100 in the connected plurality of shield panels 106 to be easily replaced both on the spacecraft 100 and with each other.

It should be noted that these are only exemplary embodiments. The dimensions of the shield panel 300 may be adjusted depending on the shape of the spacecraft, contours of specific modules, flexibility of the shield material used, launch weight considerations, and other relevant circumstances known to those of ordinary skill in the art.

Second Exemplary Embodiment

Figure 7A:
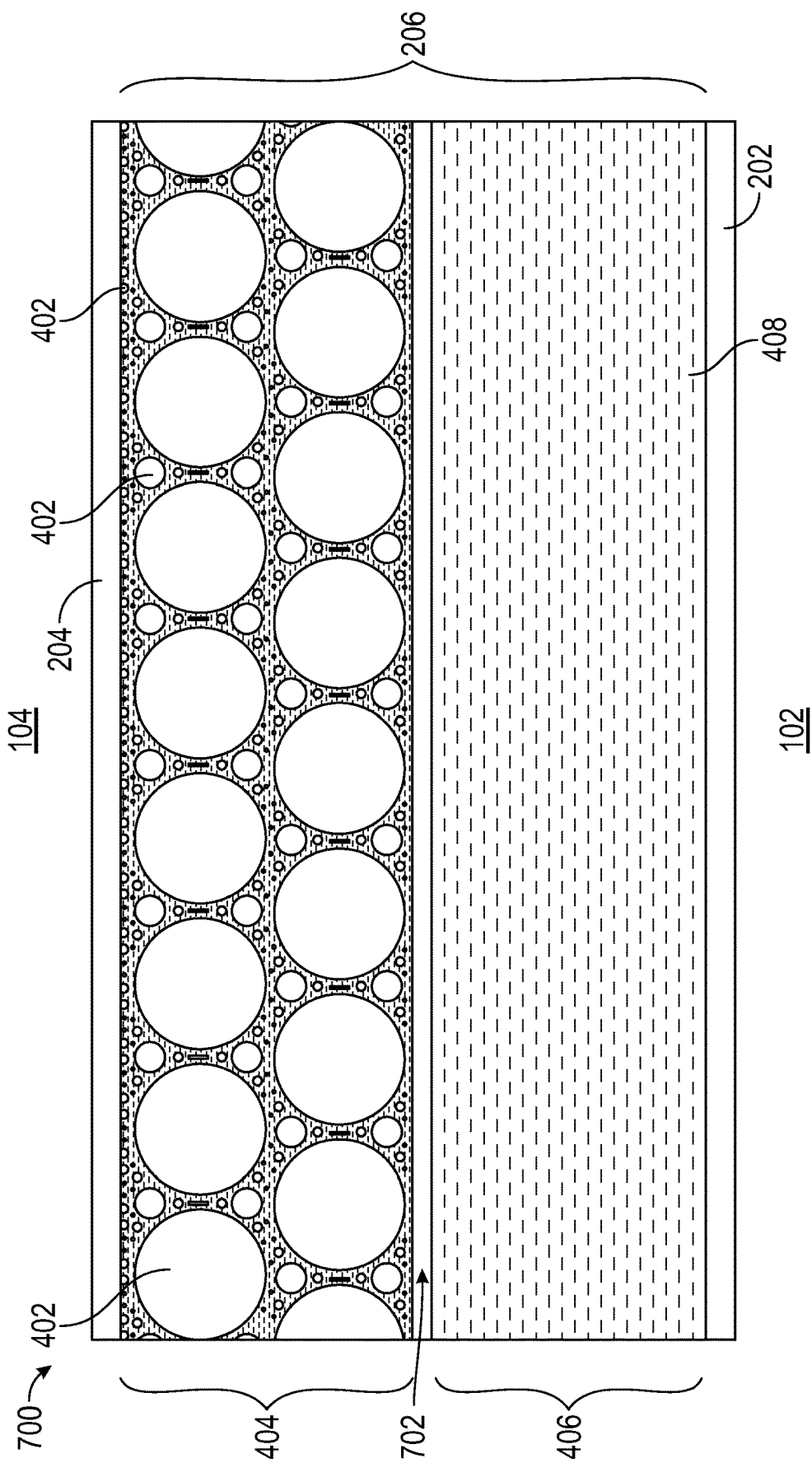
FIG. 7A is a view of a portion of the shield panel along lines IV-IV of FIG. 2 according to an exemplary embodiment in which the shield panel includes a mesh member.
Figure 7B:
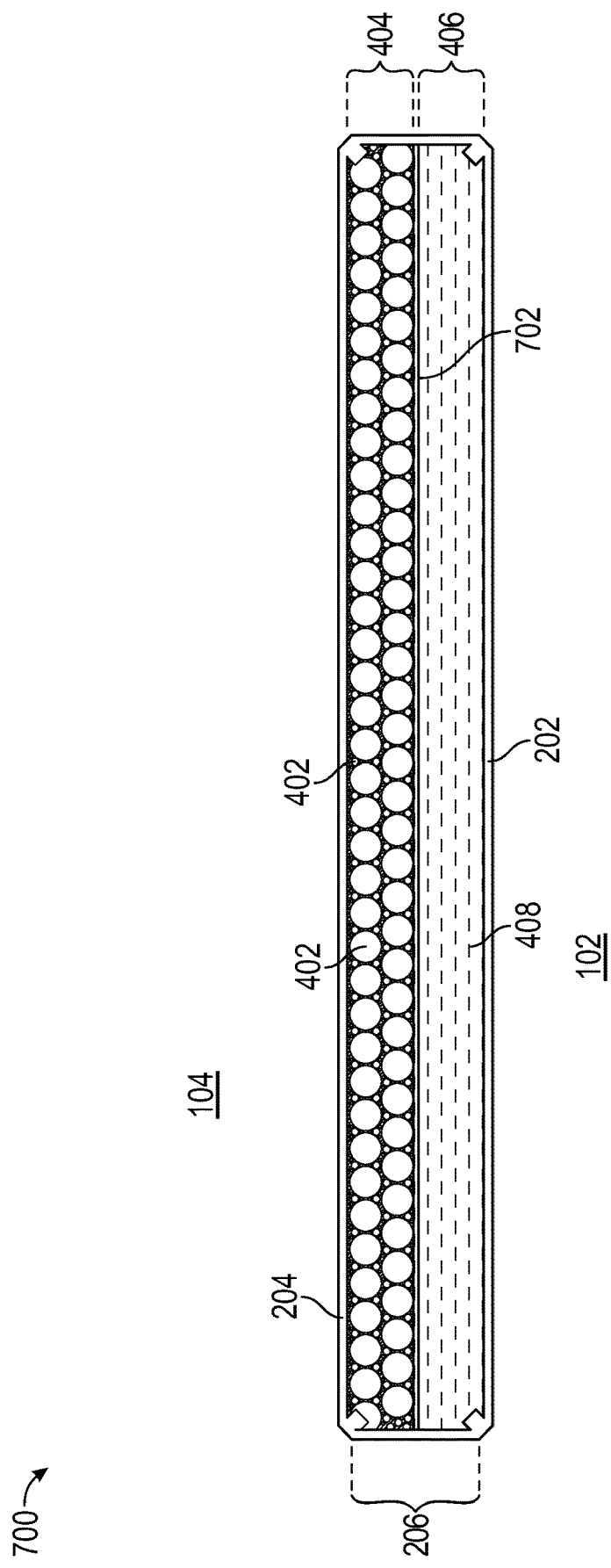
FIG. 7B is a view of the entire shield panel along lines IV-IV of FIG. 2 according to an exemplary embodiment in which the shield panel includes the mesh member.
Figure 8:
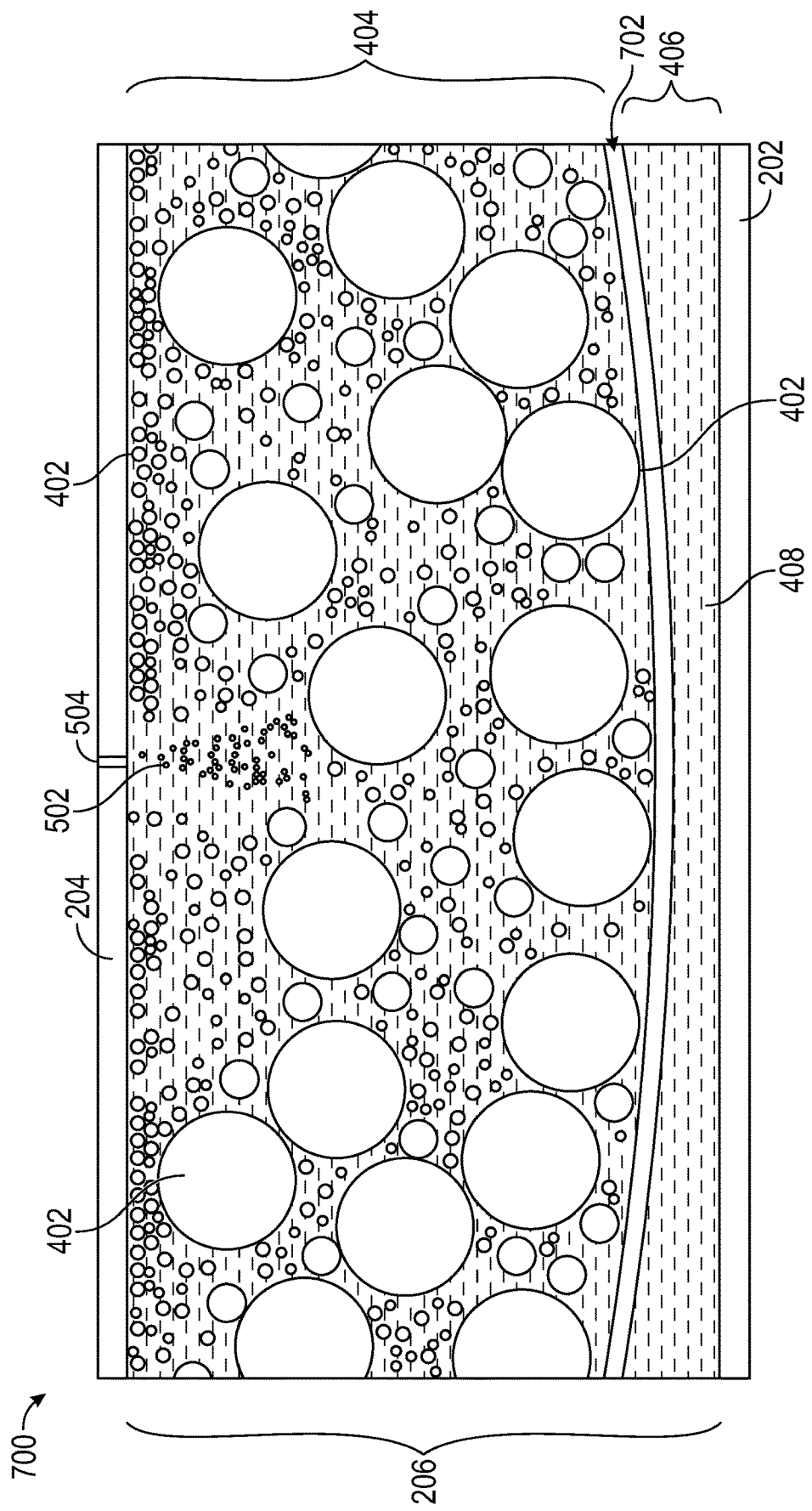
FIG. 8 is a view of the shield panel with the mesh member at the moment of impact from a high velocity particle.

Referring to FIGS. 7-8, a second exemplary embodiment will be discussed with respect to a case in which it operates in a state of zero gravity. For example, the central hub 108 in FIGS. 13-14 may not be rotating, thus no artificial gravity may be generated.

Referring to FIGS. 7A-B, a shield panel 700 includes a mesh member 702. The shield panel 700 includes an exterior shield layer 204 exposed to an external environment 104 and an interior shield layer 202 exposed to an interior environment 102. The exterior shield layer 204 and the interior shield layer 202 are connected to define a cavity 206. The cavity 206 includes the mesh member 702, a plurality of spheroids 402 and a dilatant fluid 408. The plurality of spheroids 402 can fill 50 percent of the volume of the cavity 206 and the remaining volume of the cavity 206 filled with the dilatant fluid 408. Since the shield panel 700 is operating in a state of zero gravity, the plurality of spheroids 402 may float freely within the dilatant fluid 408.

The cavity 206 includes a first cavity layer 404 and a second cavity layer 406. The mesh member 702 can be viewed as a barrier separating the first cavity layer 404 and the second cavity layer 406. The mesh member 702 retains the plurality of spheroids 402 within the first cavity layer 404 along the interior of the exterior shield layer 204.

The mesh member 702 can be made from a tear-resistant viscoelastic polymer, such as a thermoplastic elastomer. In another embodiment, the mesh member 702 can be made of an ultra-high-molecular-weight polyethylene.

As discussed more fully below, a plurality of shield panels 106 of the second embodiment can be joined together by a synthetic fiber thread 1202 connected to a spacecraft 100. To that end, referring to FIGS. 9-10, a shield panel 900 including the mesh member 702 may have a grommet 902 on a corner of the exterior shield layer 204. The grommet 902 can be made of metal, hardened plastic, synthetic fiber, or other high-tensile strength material known in the art.

Referring to FIG. 12A, a shield panel 900 of the second embodiment can be connected to three other shield panels 900 of the second embodiment, all of which are connected to the spacecraft 100 by the synthetic fiber threading 1202. The synthetic fiber threading 1202 may be the same synthetic fiber used in the construction of the shield panel 900, or other high-tensile strength material known in the art.

Referring to FIGS. 12B-C, a shield panel 900 of the second embodiment can be connected to other shield panels of the second embodiment, wherein a ring 1204 connects through a grommet 902 connected to each shield panel 900. The ring 1204 may be made from hardened plastic, metal, synthetic fiber, or other materials of high-tensile strength commonly known in the art.

Alternatively, referring to FIG. 11A-C, a plurality of shield panels 106 of the second embodiment can be joined together through an interlocking flush mount 1102 connected to a side of a shield panel 900 such that the shield panel 900 may be connected to another shield panel 900 on a side, in varying combinations. Two interlocking flush mounts 1102A may be connected together. The interlocking flush mount 1102 may be made from hardened plastic, metal, synthetic fiber, or other materials of high-tensile strength commonly known in the art.

Referring back to FIG. 1, a plurality of shield panels 106 can be joined together to form a shield that covers an entire spacecraft 100 to provide protection from the external environment 104 in one exemplary embodiment.

Referring to FIGS. 13-14, a plurality of shield panels 106 can be joined together to form a shield that covers the outer rim 112 of a spacecraft 1300 in varying exemplary embodiment.

Operation

Referring to FIG. 8, the shield panel 700 upon moment of impact is shown. Impact from an HVP 502, may form a puncture hole 504 in the external shield layer 204, resulting in the HVP 502 entering the cavity 206. The HVP 502 may disintegrate upon impact. As the HVP 502 enters the cavity 206, the kinetic energy from the HVP 502 is dispersed laterally and radially from the plurality of spheroids 402.

Concurrently, the kinetic energy dispersed from the HVP 502 impact reacts with the surrounding dilatant fluid 408 such that the force of kinetic energy from the HVP 502 impact and the kinetic energy transferred to the plurality of spheroids 402 increases the viscosity of the dilatant fluid 408, absorbing kinetic energy from the HVP 502 impact and dispersions thereof. The vacuum of space, the flow of the dilatant fluid 408, and the force applied by the mesh member 702 directs the plurality of spheroids 402 to the first cavity layer 404 to heal the puncture hole 504, self-healing the shield panel 700 similar to the case of a shield panel 300 operating in a state of artificial gravity. The mesh member 702 is pliable to accommodate the force of the kinetic energy from HVP 502 impact but returns to its original shape to ensure self-healing.

If the shield panel 700 undergoes multiple HVP 502 impacts such that it is no longer able to self-heal, only the dilatant fluid 408 in the shield panel 700 will drain, allowing replacement of the shield panel 700, as well as the retainment of the plurality of spheroids 402.

Construction

An exemplary method of making the shield will be discussed with respect to an exemplary embodiment in which each shield panel 700 has dimensions of 55 cm×55 cm×6.5 cm.

The interior shield layer 202 can be formed concurrently with the exterior shield layer 204. Woven synthetic fiber sheets are cut to the dimensions 17 cm×135 cm. At 6.5 cm of length, the synthetic fiber sheet is creased. At 7.5 cm, the synthetic fiber sheet is creased. At 8.5 cm, it is creased once more. This creates two lengths of 1 cm between the creases. Within the 1 cm crease, two strips of pressure sensitive adhesive tape of 1 cm width are placed on either side of the crease. The same process is completed at 6.5 cm of length from the opposite end of the sheet. This creates two lengths of 1 cm between the creases.

The mesh member 702 can be in a triangle lattice cut of dimensions 17 cm×17 cm.

One edge of the mesh member 702 is placed into the crease. The crease is sewed shut and heated to 135° C. to heat-weld the seam as well as accelerate the curing of the pressure sensitive adhesive. The above process is repeated for the other edge of the mesh member 702.

These 1 cm lengths are overlapped and heat-welded at no more than 135° C. to heat weld the seam. The welded 1 cm length will be on the inside of the shield panel. The above process is repeated at 6.5 cm from the first crease to form a second crease. The process is repeated to form a third crease 55 cm from the length of the second crease. A fourth crease is formed 6.5 cm from the third crease using the same process. This forms an open-ended cuboid on two sides with overlapping edges. Finally, the overlapping edges are heat-welded to form an enclosed cuboid.

A sheet of woven synthetic fiber measuring 8.5 cm×57 cm is creased 1 cm from each edge along the length and height of the sheet. The creases 410 are inlaid within one open end of the cuboid and heat-welded on all four edges where the creases 410 line the open end of the cuboid. This forms a cuboid with only one open end and fully enclosed on all other sides, defining a cavity 206. After the cavity 206 has been filled, the shield panel 700 is placed on an oscillating table. The oscillations will shift the plurality of spheroids 402 to cause granular segregation, or the Brazil nut effect, guaranteeing that smaller-diameter spheroids will be retained in the first cavity layer 404, with the larger spheroids stacking below the smaller spheroids.

Referring now to FIG. 9, a shield panel 900 of the second embodiment may be connected to a plurality of other shield panels 900 of the second embodiment through a grommet 902 inlaid into a corner of the shield panel 900. Similar to the first embodiment, a sheet of woven synthetic fiber with the inlaid grommet 902 can be heat-welded to one or more corners of a shield panel 900 with the mesh member 702 such that a synthetic fiber thread 1202 connected to a spacecraft 100 can be threaded through the grommet 902. All four corners of the shield panel 900 may have the grommet 902 inlaid, such that the plurality of shield panels 106 can be connected by the synthetic fiber threading 1202. Thus, each synthetic fiber thread 1202 may connect up to four shield panels 900 to the spacecraft 100 to form a shield of the plurality of shield panels 106.

Referring to FIG. 12A, a shield panel 900 of the second embodiment can be connected to three other shield panels 900 of the second embodiment, all of which are connected to the spacecraft 100 by the synthetic fiber threading 1202.

Referring to FIGS. 12B-C, a shield panel 900 of the second embodiment can be connected to other shield panels of the second embodiment, wherein a ring 1204 connects through a grommet 902 connected to each shield panel 900. A synthetic fiber thread 1202 connected to a spacecraft 100 may connect to the ring 1204, connecting a plurality of shield panels 106 to the spacecraft 100.

In a case where the spacecraft 100 has a metallic hull, the synthetic fiber thread 1202 may be woven into the spacecraft 100 itself to connect the plurality of shield panels 106. In a case where the spacecraft 100 has a synthetic fiber hull, the synthetic fiber thread 1202 can be woven or heat-welded into the surface of the spacecraft 100. The ring 1204 may be made from hardened plastic, metal, synthetic fiber, or other materials of high tensile strength commonly known in the art.

Alternatively, referring to FIG. 11A-C, a plurality of shield panels 106 can be joined together through an interlocking flush mount 1102 connected to a side of a shield panel 1100 such that the shield panel 1100 may be connected to another shield panel 110 on each side, in varying combinations. Similar to the first embodiment, the shield panel 1100 of the second embodiment may be connected to the spacecraft 100 itself through the interlocking flush mount 1102A which is connected to the spacecraft 100 and a side of the shield panel 1100.

It should be noted that these are only exemplary embodiments. The dimensions of the shield panel 700 may be adjusted depending on the shape of the spacecraft, contours of specific modules, flexibility of the shield material used, launch weight considerations, and other relevant circumstances known to those of ordinary skill in the art, Field Experiment Results To test the effectiveness of the proposed shielding, a ballistics test was performed. A high-powered .22 caliber rifle was used to fire bullets at identical plastic containers holding different combinations of water, oobleck (a dilatant fluid created from water and cornstarch), synthetic fibers (Kevlar®)), and metal spheres. The identical plastic containers were used to simulate the cavity of the shield panel. A high-powered .22 caliber rifle was used to mimic HVPs through the extremely high kinetic energy produced by a rifle shot. Though the rifle projectile was higher in mass and lower in velocity than a true HVP, its density and non-porous nature proved to be an effective independent variable in conducting experiments. Plastic containers were used as their composition was thin and brittle, and thus of negligible stopping power, allowing experimenters to ignore their effect when testing the different variables.

Water was utilized as a variable to determine the differences between a Newtonian fluid and non-Newtonian fluid such as oobleck in absorbing the kinetic energy. Metal spheres were used as the plurality of spheroids in order to determine the dispersion of kinetic energy from the rifle shot, while Kevlar® was used to simulate an exemplary embodiment of synthetic fibers for forming the shield panel.

In the first test, the plastic container was filled only with water as a control. Upon firing the bullet, the kinetic energy from impact splintered the plastic container into multiple fragments. Thus, using water alone failed to significantly dampen the impact of the bullet. In the second test, the plastic container was filled with only oobleck. Similarly, the plastic container splintered into multiple components. In the third test, metal spheres suspended in a thin plastic bag at the face of the container were added to the plastic container along with water to determine the efficacy of the plurality of spheroids without a dampening dilatant fluid. The plastic container showed a clear entry hole but did not splinter. However, the metal spheres were widely dispersed within the plastic container from the kinetic energy, suggesting that the kinetic energy was dispersed throughout the cavity of the plastic container. In the fourth test, metal spheres suspended in a thin plastic bag at the face of the container were added to the plastic container along with oobleck. The plastic container showed a clear entry hole, but again did not splinter. Additionally, the metal spheres were not as widely dispersed as with water, suggesting a dilatant fluid absorbs some of the kinetic energy. In the final test, oobleck and a sheet of Kevlar® with metal spheroids suspended within the Kevlar® were added to the plastic container to simulate an embodiment of the shield panel. The sheet of Kevlar® was lined within the interior wall of the plastic container and the container was filled with oobleck and the metal spheres. This proved most effective, as the plastic container showed an entry hole but the metal spheres were the least dispersed. Additionally, the rifle projectile remains were indiscernible. Finally, the Kevlar® sheet was minimally damaged for further use. Thus, the combination of synthetic fiber sheet, dilatant fluid, and a plurality of spheroids was shown to disperse and absorb the kinetic energy favorably when compared to the other combinations in the ballistics experiment.

What is claimed is:

1. A self-healing shield panel for protecting an interior environment from impact of a high-velocity particle (HVP), the shield panel comprising:
   an exterior shield layer exposed to an exterior environment on a first surface of the exterior shield layer;

an interior shield layer exposed to the interior environment on a first surface of the interior shield layer, the interior shield layer connected to the exterior shield layer to define a cavity between the exterior shield layer and the interior shield layer;
a dilatant fluid in the cavity; and
a plurality of spheroids arranged in the dilatant fluid to absorb kinetic energy from the HVP,
wherein when the interior environment is in an artificial gravity state, the cavity includes a first cavity layer on the exterior shield layer and a second cavity layer on the interior shield layer, wherein the first and second cavity layers include the dilatant fluid, wherein the plurality of spheroids are arranged only in the first cavity layer during a rest state where zero kinetic energy exists in the cavity.

2. The shield panel of claim 1, wherein the plurality of spheroids are arranged to move into the second cavity layer during an active state in which kinetic energy exists from the HVP impact and thereby absorb the kinetic energy.

3. The shield panel of claim 1, wherein the plurality of spheroids are arranged to move towards and fill a puncture hole existing on the first surface of the exterior shield layer from the HVP impact and thereby prevent leakage of the dilatant fluid.

4. The shield panel of claim 1, wherein the exterior shield layer and the interior shield layer include a synthetic fiber.

5. The shield panel of claim 1, wherein the dilatant fluid is polyethylene glycol or polypropylene glycol.

6. The shield panel of claim 1, wherein the plurality of spheroids are polymer.

7. The shield panel of claim 1, having a dimension of 55 cm×55 cm×5 6.5 cm, wherein the exterior shield layer is connected to the interior shield layer.

8. The shield panel of claim 1, wherein the plurality of spheroids is a high strength plastic material.

9. The shield panel of claim 1, wherein the plurality of spheroids is a metallic material.

10. The dilatant fluid of claim 1, wherein the dilatant fluid includes a plurality of suspended fumed silica nanoparticles and rods.

11. A shield including a plurality of the shield panels of claim 1 connected to completely enclose the interior environment.

12. The shield panel of claim 1,
wherein, the exterior shield layer and the interior shield layer each comprise a plurality of synthetic fibers woven together; and
a grommet is connected to each corner of the exterior shield layer.

13. A spacecraft including a plurality of the shield panels of claim 1, comprising:
a central hub;
a plurality of spokes, the plurality of spokes connected to the central hub;
an outer rim, the outer rim connected to the plurality of spokes,
wherein the plurality of shield panels are connected to the outer rim.

14. The spacecraft of claim 13, wherein the plurality of shield panels are connected by interlocking flush mounts.

15. The spacecraft of claim 13, wherein the plurality of shield panels are connected to the central hub and the plurality of spokes.

16. A self-healing shield panel for protecting an interior environment from impact of a high-velocity particle (HVP), the shield panel comprising:
an exterior shield layer exposed to an exterior environment on a first surface of the exterior shield layer;
an interior shield layer exposed to the interior environment on a first surface of the interior shield layer, the interior shield layer connected to the exterior shield layer to define a cavity between the exterior shield layer and the interior shield layer;
a dilatant fluid in the cavity; and
a plurality of spheroids arranged in the dilatant fluid to absorb kinetic energy from the HVP;
a mesh member in the cavity,
wherein when the interior environment is in a zero gravity state, the cavity includes a first cavity layer on the exterior shield layer and a second cavity layer on the interior shield layer, wherein the first and second cavity layers include the dilatant fluid, wherein the mesh member retains the plurality of spheroids only in the first cavity layer during a rest state where substantially zero kinetic energy exists.

17. The shield panel of claim 16, wherein during an active state in which kinetic energy exists from the HVP impact, the mesh member is configured to temporarily expand to accommodate motion of the plurality of spheroids into the second cavity layer and thereby absorb the kinetic energy.

18. The shield panel of claim 16, wherein the mesh member is a tear resistant viscoelastic polymer.

19. The shield panel of claim 16, wherein the mesh member is ultra-high-molecular-weight polyethylene.

20. A self-healing shield panel for protecting an interior environment from impact of a high-velocity particle (HVP), the shield panel comprising:
an exterior shield layer exposed to an exterior environment on a first surface of the exterior shield layer;
an interior shield layer exposed to the interior environment on a first surface of the interior shield layer, the interior shield layer connected to the exterior shield layer to define a cavity between the exterior shield layer and the interior shield layer;
a dilatant fluid in the cavity; and
a plurality of spheroids arranged in the dilatant fluid to absorb kinetic energy from the HVP,
wherein 67% of the plurality of spheroids have a diameter of 0.17 mm, 22% have a diameter of 0.7 mm, 7.6% have a diameter of 3 mm, and 3.4% have a diameter of 1.26 cm.

* * * * *